(12) United States Patent
Goto et al.

(10) Patent No.: US 6,217,089 B1
(45) Date of Patent: Apr. 17, 2001

(54) BUMPER REINFORCING MEMBER

(75) Inventors: Hiroshi Goto; Yasuaki Hiramatsu, both of Soja (JP)

(73) Assignee: OM Corporation, Okayama (JP)

( * ) Notice: Subject to any disclaimer, the term of this patent is extended or adjusted under 35 U.S.C. 154(b) by 0 days.

(21) Appl. No.: 09/452,503

(22) Filed: Dec. 1, 1999

(51) Int. Cl.$^7$ .................................................. B60R 19/02
(52) U.S. Cl. ............................................. 293/102; 293/122
(58) Field of Search ..................................... 293/102, 121, 293/122; 52/731.2, 731.6, 731.7, 732.1, 732.2

(56) References Cited

U.S. PATENT DOCUMENTS

| | | |
|---|---|---|
| 5,306,058 | 4/1994 | Sturrus et al. . |
| 5,340,178 * | 8/1994 | Stewart et al. .................... 293/122 |
| 5,395,036 | 3/1995 | Sturrus . |
| 5,425,561 | 6/1995 | Morgan . |
| 5,722,708 | 3/1998 | Jonsson . |
| 6,003,912 * | 12/1999 | Schonhoff et al. .................. 293/122 |

* cited by examiner

*Primary Examiner*—D. Glenn Dayoan
*Assistant Examiner*—Lori L. Coletta
(74) *Attorney, Agent, or Firm*—Koda & Androlia

(57) ABSTRACT

A bumper reinforcing member obtained from a tubular article of a closed cross-section. The tubular article is continuously manufactured by folding a first side edge portion of an original metal sheet along a folded-back edge portion and along a folded-in edge portion in this order, bonding a contacting face portion that extends from an edge of the first side edge portion to the folded-back edge portion to an inside of a bumper front face, forming a half of a bumper cross-section by connecting the inside of the bumper front face and the inside of a bumper rear face with a reinforcing rib that extends from the edge of the first side edge portion to the folded-back edge portion, and forming the remaining half of a bumper cross-section by bonding a second side edge portion of the original sheet to a vicinity of the folded-in edge portion.

3 Claims, 9 Drawing Sheets

BUMPER REINFORCING MEMBER

BACKGROUND OF THE INVENTION

1. Field of the Invention

The present invention relates to a bumper reinforcing member which is a rigid member for an automobile bumper.

2. Description of the Related Art

Recently, most automobile bumpers are designed so that the bumper reinforcing member, which is a rigid member, is covered with a decorative plastic cover. This bumper has advantages. A performance of the rigid member is pursued without paying attention to the external appearance of the bumper reinforcing member itself, and the design of an automobile is enhanced by making the color of the plastic cover identical with that of the body of the automobile.

The bumper reinforcing member can be roughly classified into two types: a box-like section type and a closed cross-section type. The box-like section type is basically a tubular structure, and two sheet materials formed separately are connected to each other as disclosed in U.S. Pat. No. 5,722,708. In the closed cross-section type, one sheet material is roll-formed as disclosed in U.S. Pat. Nos. 5,306,058, 5,395,036 and 5,813,594.

In either bumper reinforcing member, the plastic cover is applied to a bumper front face, and a bumper rear face is connected to a bumper base of the automobile. A space formed inside the tubular structure absorbs and disperses a force at the time of a collision, thus protecting the automobile body, which is the main object of the bumper.

In order to further improve the structural strength of bumpers, there is an example in which a separate member such as beam reinforcing plate or bulkhead is attached to the bumper reinforcing member. This is taught by U.S. Pat. No. 5,425,561, for instance. This type of additional separate member is frequently seen in the box-like section type bumper reinforcing member. In addition, so as to improve the structural strength, there is another example in which an original sheet constituted by bonding a plurality of sheet materials different in kind or thickness is roll-formed so as to manufacture the bumper reinforcing member. This is shown in Japanese Patent Application Laid-Open No. 227331/1994.

The demands imposed on the bumper reinforcing member are (1) providing a sufficient structural strength (impact resistance) as the rigid member, (2) lightening an automobile in order to improve its fuel consumption and (3) keeping the manufacturing cost low. The demand (1) is often contradictory to the demands (2) and (3); and if the structural strength is increased, the lightening of an bumper and a reduction in the manufacturing cost become difficult. Therefore, the key is how the demands (2) and (3) are achieved while satisfying the demand (1).

First, the bumper reinforcing member cannot buckle at a time of a collision since this cannot protect the automobile body. Accordingly, for many bumper reinforcing members, it is necessary to add a separate member. As a result, the number of parts of the bumper reinforcing member and an additional step in the assembling process are inevitably unavoidable. In particular, if the assembling process is separately required, the advantage of roll forming that makes continuous manufacturing possible is impaired, thus increasing the manufacturing cost. Accordingly, it has been considered to increase the thickness of the sheet material instead of adding separate members. However, since this leads to a weight increase of the bumper reinforcing member, it is not preferable.

SUMMARY OF THE INVENTION

Accordingly, the object of the present invention is to provide a bumper reinforcing member which requires no use of separate members for the purpose of reducing the manufacturing cost, ensures a necessary sufficient structural strength without aiming at an increase in the sheet thickness accompanying the weight increase, and has a sectional structure capable of being continuously manufactured using the roll forming method.

The object is accomplished by a unique structure for a bumper reinforcing member obtained from a tubular article which is manufactured by roll-forming an original sheet into a tubular shape and then cutting and separating the tubular article of a closed cross-section for every product length; and such a tubular article is obtained by: folding a first side edge portion of an original sheet along a folded-back edge portion and then a folded-in edge portion in this order, bringing a contacting face portion, that extends from a side edge of the first side edge portion to the folded-back edge portion, so as to contact an inside of a bumper front face, forming a half of a bumper cross-section by connecting the inside of the bumper front face to the inside of a bumper rear face by way of using a portion that extends from the folded-back edge portion to the folded-in edge portion as a reinforcing rib, and forming the remaining half of the bumper cross-section by bonding a second side edge portion of the original sheet to a vicinity of the folded-in edge portion.

The actual bumper reinforcing member is usually curved. Thus, the obtained tubular article is cut and separated for every product length after having the tubular article gradually curved.

DETAILED DESCRIPTION OF THE PREFERRED EMBODIMENTS

For convenience of explanation, each of the shown bumper reinforcing members 1 has an approximately rectangular pipe shape and rounded corners; and the holes for mounting the bumper reinforcing member to an automobile body and for covering it with a plastic cover and the like are omitted.

Figure 1:
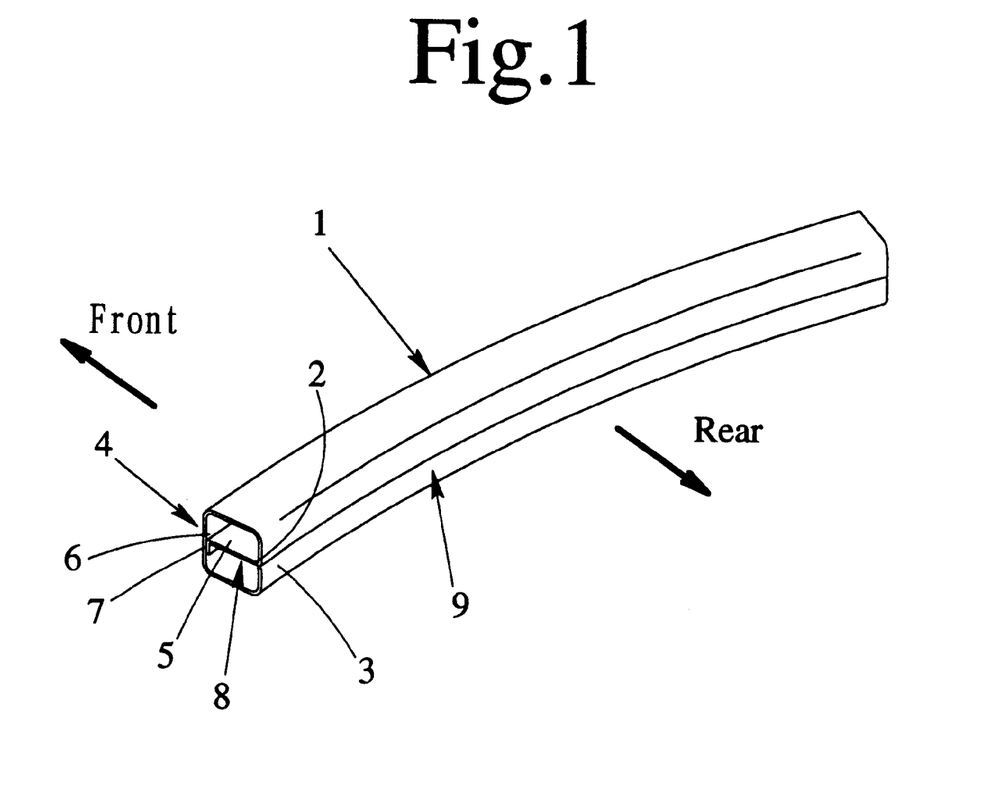
FIG. 1 is a perspective view showing the basic external appearance of a bumper reinforcing member according to the present invention.
Figures 2, 3:
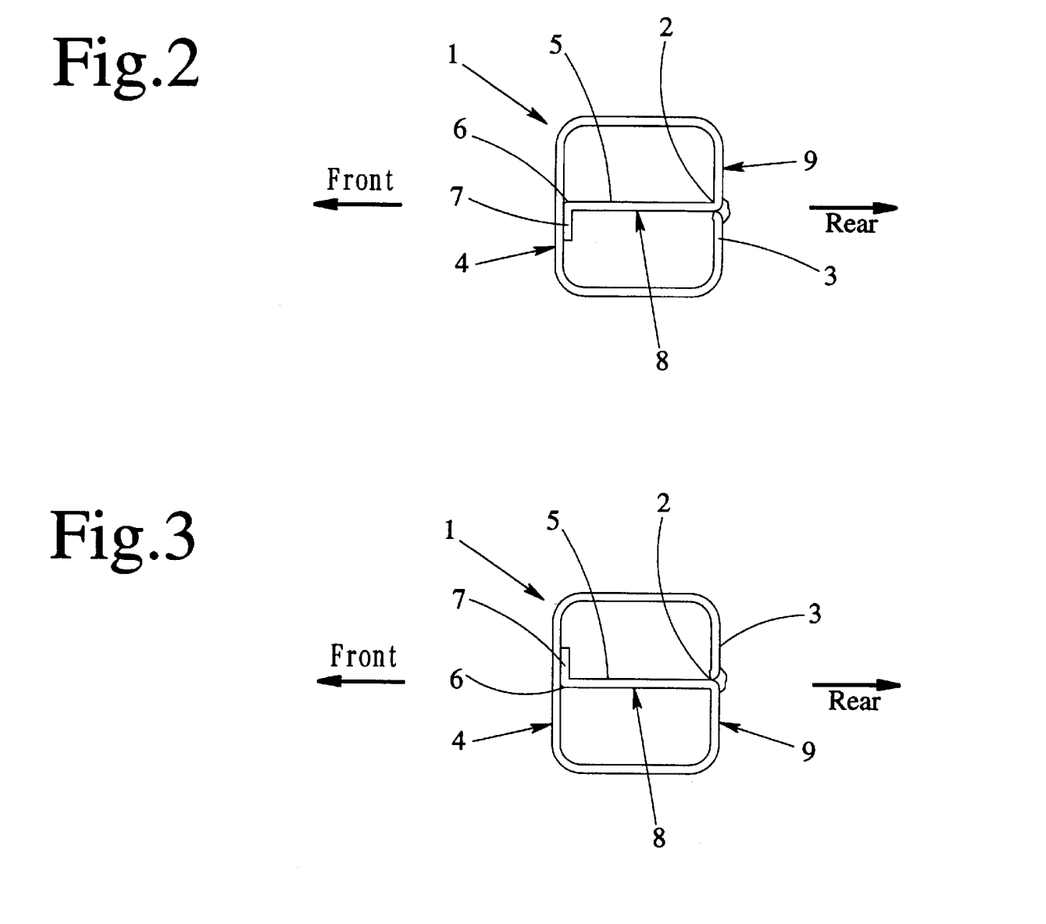
FIG. 2 is a side view of the bumper reinforcing member.
FIG. 3 is a side view of the bumper reinforcing member that is used upside-down.

As seen from FIG. 1 and FIG. 2, in the bumper reinforcing member 1 of the present invention, a first side edge portion 5 (of an original sheet, typically a metal sheet) is folded toward a bumper front face 4 via a folded-in edge portion 2 and is further folded at a folded-back edge portion 6, and a contacting face portion 7 that extends from a side edge of the side edge portion 5 to the folded-back edge portion 6 is bonded to the inside of the bumper front face 4. For such bonding, besides a spot welding mentioned later, a TIG welding, a plasma welding, a laser welding, and the like are employed. A second side edge portion 3 (of the original sheet) is butted against the folded-in edge portion 2 and continuously welded thereto. For the bonding of the second side edge portion 3 to the folded-in edge portion 2, the plasma welding, the laser welding and the like are used. In this manner, the tubular bumper reinforcing member 1 of a closed cross-section type is obtained by a single original sheet.

As seen in FIG. 2, the bumper reinforcing member 1 of the shown embodiment has a cross-sectional structure in which a part that extends from the folded-back edge portion 6 to the folded-in edge portion 2 makes a reinforcing rib 8, and the inside of the bumper front face 4 and the inside of a bumper rear face 9 inside are connected by the reinforcing rib 8. The first side edge portion 5 that constitutes the reinforcing rib 8 is interposed between the folded-back edge portion (valley folding) 6 and the folded-in edge portion (mountain folding) 2 that have opposite folding directions; thus, it can be easily formed by a continuous process (roll forming). Further, the contacting face portion 7, which is continuous to the reinforcing rib 8, is bonded to the inside of the bumper front face 4; accordingly, a one-piece body property between the reinforcing rib 8 and the bumper front face 4 is enhanced, and it is possible to prevent a buckling of the bumper reinforcing member 1.

Figure 4:
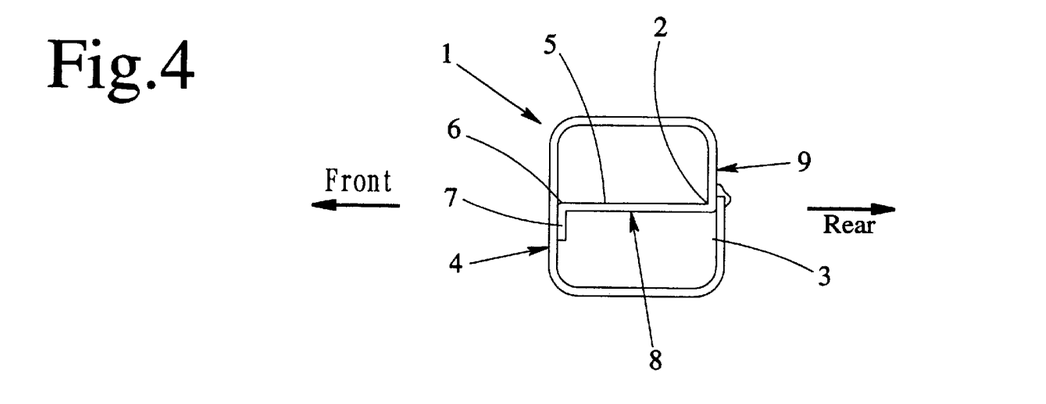
FIG. 4 is a side view of the bumper reinforcing member in which the second side edge portion is overlapped on and bonded to a folded-in edge portion.

The bumper reinforcing member 1 of the present invention can be used in the direction shown in FIG. 3 in addition to the way shown in FIG. 2. Further, as seen in FIG. 2, in the bumper reinforcing member 1 of the shown embodiment, the side edge of the second side edge portion 3 is bonded to the folded-in edge portion 2 by a line contact. The side edge of the second side edge portion 3 tucks it a little into inner direction and welds it. However, since in the present invention it is sufficient if the bumper reinforcing member of a closed cross-section type is obtained, the second side edge portion 3 can be overlapped on and surface-contacted with a vicinity of the folded-in edge portion 2 and bonded thereto, as seen in FIG. 4, when a stronger bonded strength is taken into consideration.

Figure 5:
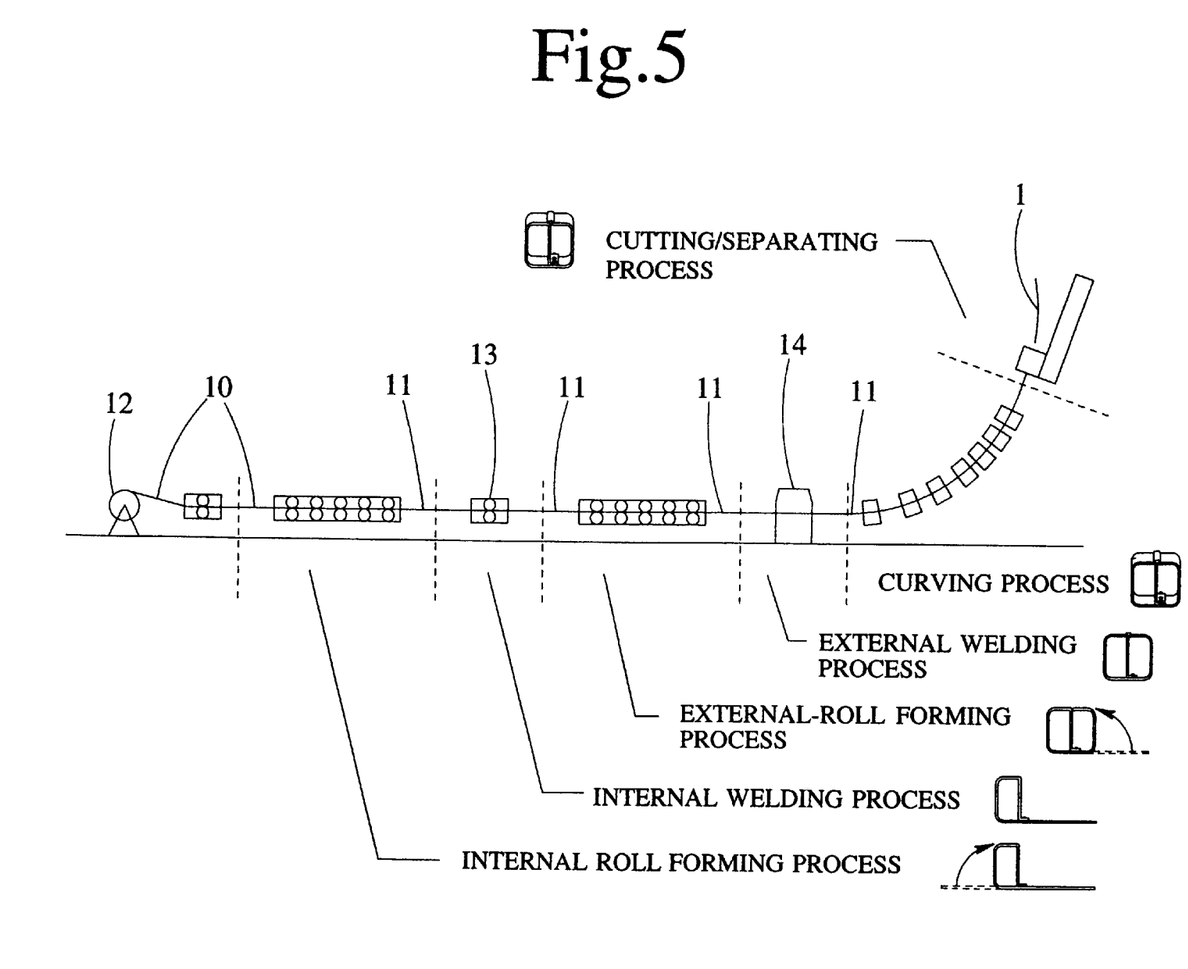
FIG. 5 is a structural view showing a manufacturing line of the bumper reinforcing member of FIG. 1.

FIG. 5 shows a manufacturing line for making the bumper reinforcing member 1 shown in FIG. 1.

In this manufacturing line, an original sheet 10 (FIG. 6) is fed out from an uncoiler 12, making it into a tubular article 11 (see FIG. 7) after finishing an internal roll forming process; then spot-welding (FIG. 8) is performed to the contacting portion 7 of the tubular article 11 in an internal welding process. After finishing an external roll forming process (see FIG. 9), the second side edge portion 3 is laser-welded in an external welding process (see FIG. 10).

Each of the processes described above will be explained in detail below.

Figure 6:
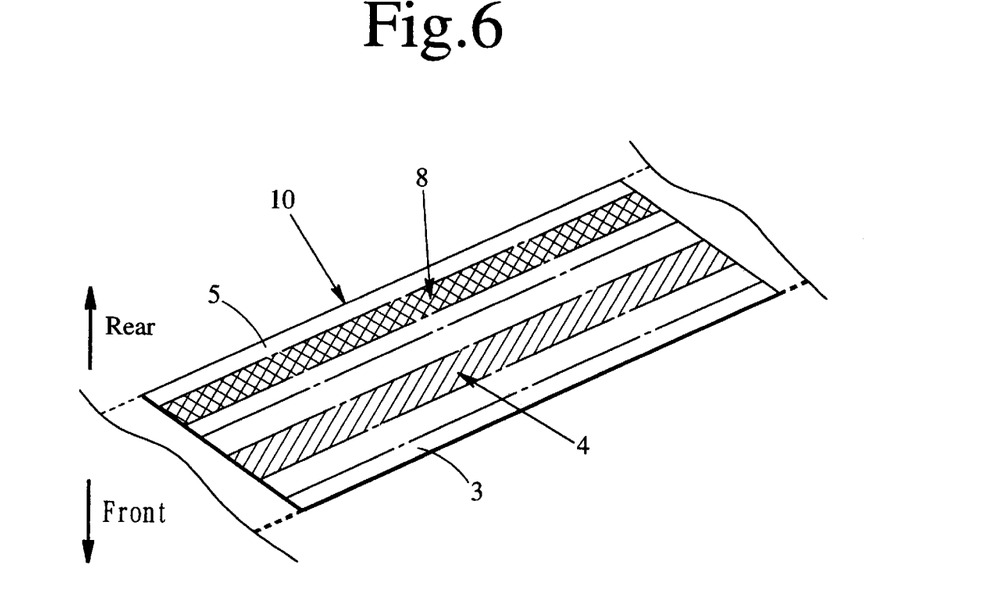
FIG. 6 is a perspective view showing an original sheet unwound from an uncoiler.

The original sheet 10, for example, a high tensile strength steel sheet, is continuously unwound from the uncoiler 12. The original sheet 10 under this state is an elongated sheet and, as seen from FIG. 6, has a form in which a plurality of sheet materials each having a predetermined product length are connected. In FIG. 6, a diagonal hatching portion represents a portion that corresponds to the bumper front face 4, and a lattice hatching portion is a portion that corresponds to the reinforcing rib 8.

Figure 7:
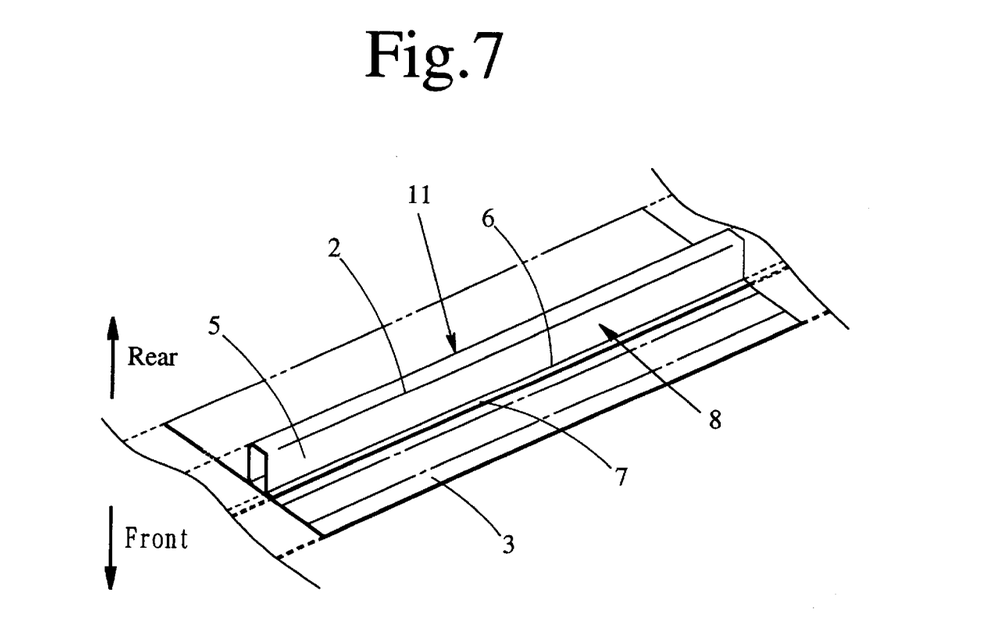
FIG. 7 is a perspective view showing a tubular article having finished an internal roll forming process.

As seen in FIG. 7, by being passed through the internal-roll forming process, the original sheet 10 is first folded at the folded-back edge portion 6 and at the folded-in edge portion 2 of the first side edge portion 5, thus forming the reinforcing rib 8. After this, the contacting face portion 7 is brought into contact with the inside of the bumper front face 4.

Figure 8:
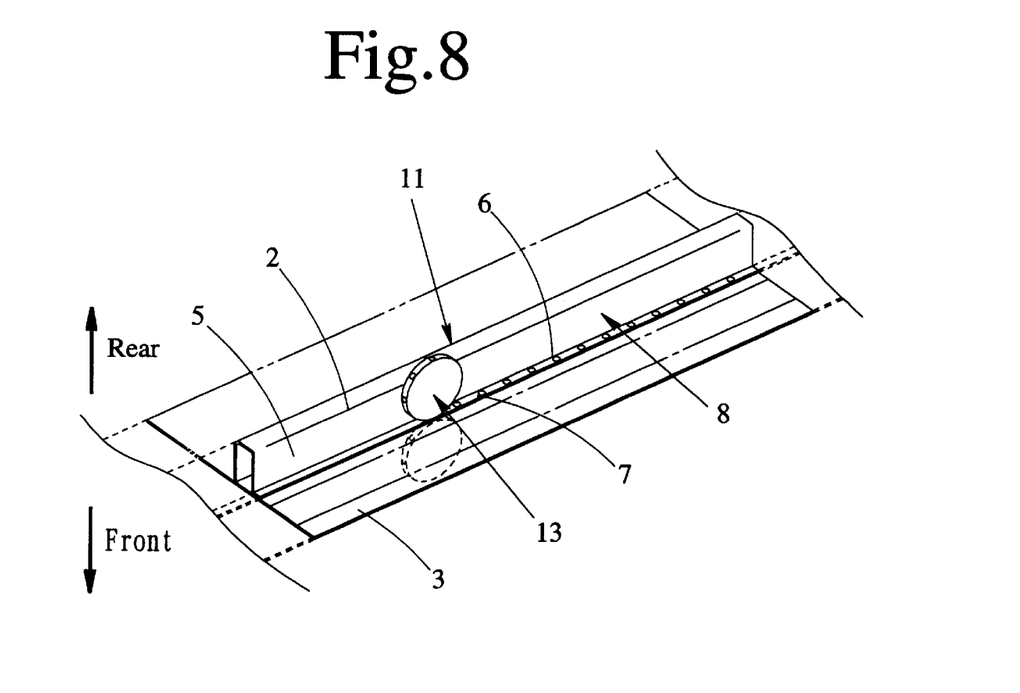
FIG. 8 is a perspective view showing the tubular article whose contacting face portion is being roll-spot-welded in an internal welding process.

As seen from FIG. 8, the contacting face portion 7 is bonded to the inside of the bumper front face 4 by being intermittently roll-spot-welded while applying a roll spot welding machine 13 from above and below. Since the second side edge portion 3 is left opened in the internal welding process, the roll spot welding machine 13 can be used as shown in FIG. 8 in order to bond the contacting face portion 7 to the inside of the bumper front face 4.

Figure 9:
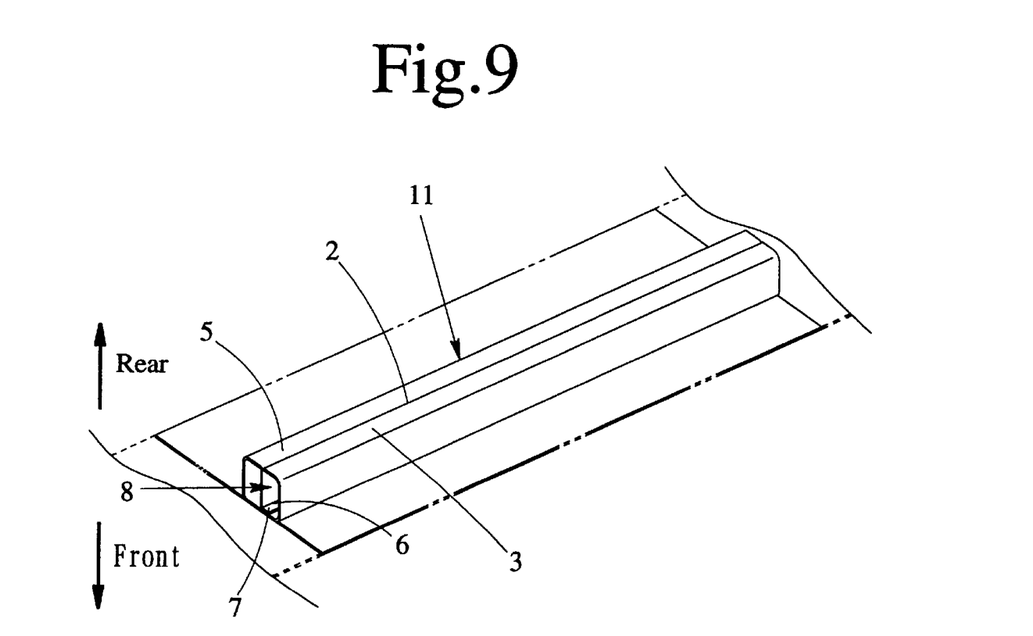
FIG. 9 is a perspective view showing the tubular article having finished an internal roll forming process.

Subsequently, as seen in FIG. 9, the tubular article 11 is conveyed to the external roll forming process, and the side edge of the other folded side edge portion 3 is butted against the folded-in edge portion 2.

Figure 10:
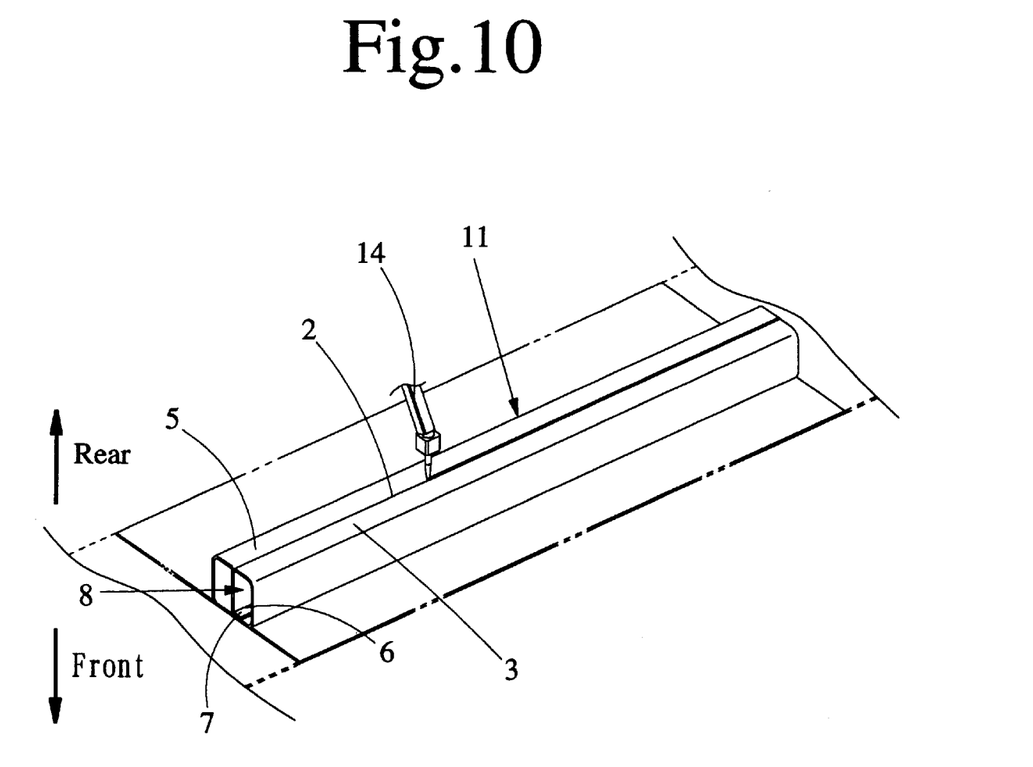
FIG. 10 is a perspective view showing the tubular article in which the second side edge portion is being laser-welded in an external welding process.

Further, as seen from FIG. 10, in the external welding process, the side edge of the second side edge portion 3 is bonded, with a laser welding machine 14, to the folded-in edge portion 2. As a result, the tubular article 11 is obtained that has an external appearance in which a plurality of bumper reinforcing members 1 (refer to FIG. 1) of a closed cross-section type are connected. In actual practice, the tubular article 11 is further continuously curved in a curving process, and thereafter, the tubular article 11 is cut and separated for every desired product length in a cutting/separating process (right end in FIG. 5). As a result, the bumper reinforcing member 1 as shown in FIG. 1 is thus obtained.

In the above, each roll forming for each of the left and right side edge portions 3 and 5 is performed in order. Accordingly, an object shape of the roll forming for each of the side edge portions 3 and 5 is individually decided; and the manufacturing line is capable of flexibly coping with changes in specification. However, in the described manufacturing line, the roll forming processes tend to have a large occupying ratio therein, so that a larger area for installing the manufacturing line is required correspondingly and a longer manufacturing time is required as well.

Figure 11:
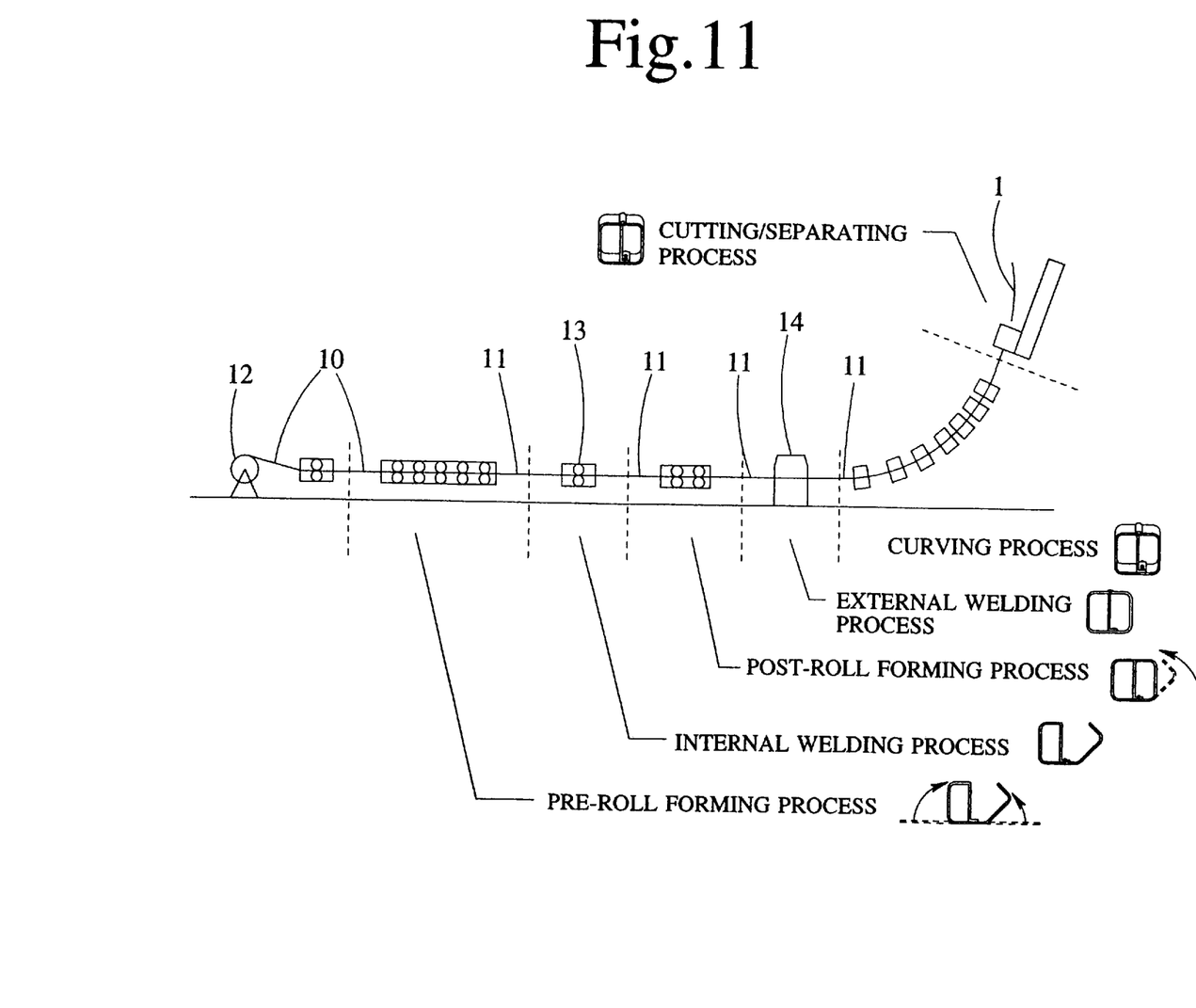
FIG. 11 is a structural view showing another example of a manufacturing line of the bumper reinforcing member of FIG. 1.

The manufacturing line shown in FIG. 11 solves the above problems. The roll forming of both side edge portions 3 and 5 are simultaneously performed so that the internal welding process is not impeded.

Figure 12:
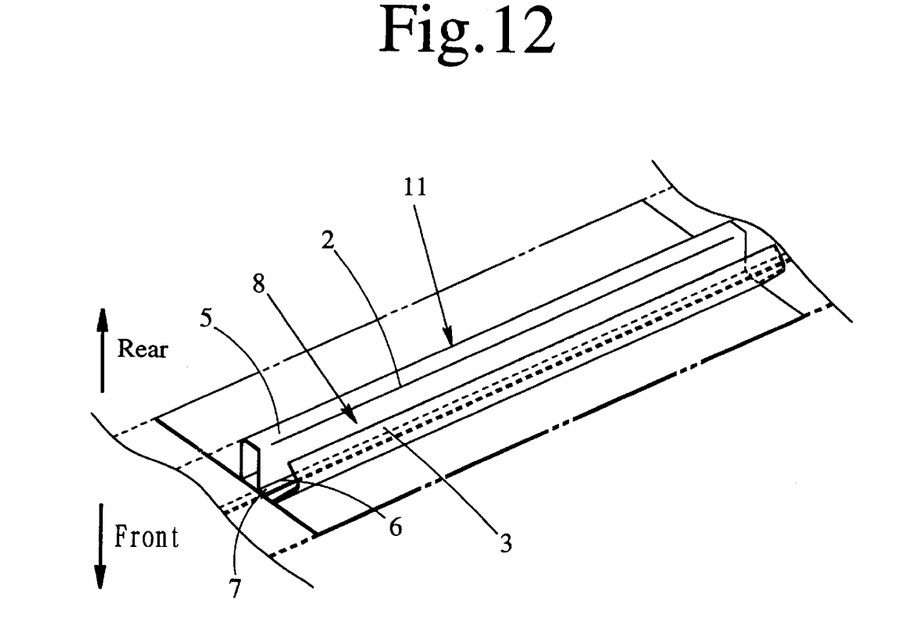
FIG. 12 is a perspective view showing the tubular article in a pre-roll forming process.
Figure 13:
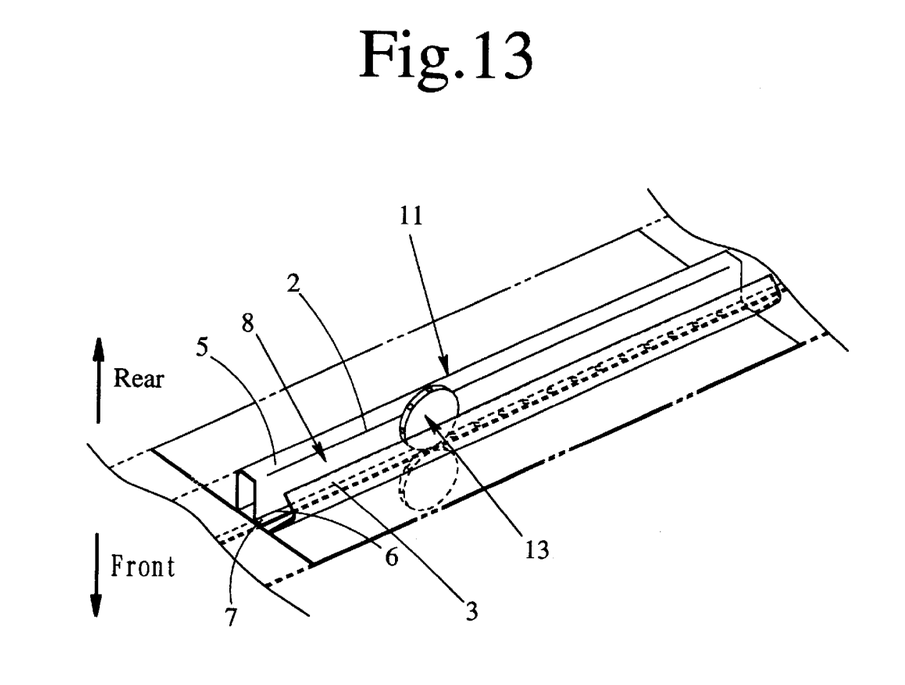
FIG. 13 is a perspective view showing the tubular article whose contacting face portion is being roll-spot-welded in an internal welding process.

More specifically, in the pre-roll forming process of this manufacturing line, both side edge portions 3 and 5 of the original sheet 10 that is unwound from the uncoiler 12 are simultaneously folded as shown in FIG. 12. In this case, the first side edge portion 5 that makes the reinforcing rib 8 is folded until the contacting face portion 7 is brought into contact with the inside of the bumper front face 4. This is the same as the previously described manufacturing line. However, in the process shown in FIG. 11, the forming of the second side edge portion 3 is stopped at its midway (compare FIG. 9 to FIG. 12), and a welding (roll spot welding) for the contacting face portion 7 is performed in the subsequent internal welding process as shown in FIG. 13. In this manner, the roll forming of both side edge portions 3 and 5 are simultaneously proceeded. As a result, a post-roll forming process for folding the residue of the second side edge portion 3 becomes shorter (compare FIG. 5 to FIG. 11), and the manufacturing line and the manufacturing time can be also become shorter.

In either manufacturing line described above, since it is necessary to bond the contacting face portion to the inside of the bumper front face, the roll forming must be performed two times by all means. In this regard, the invention provides two methods. In one manufacturing method, the roll forming of both side edge portions (the internal roll forming and the external roll forming) are performed in order; and in another method, the roll forming of both side edge portions (the pre-roll forming and the post-roll forming) are partially simultaneously performed. As described above, from the viewpoint of degree of freedom for changes in specification (design), it is preferable to separate the internal roll forming process and the external roll forming process. To the contrary, from the viewpoints of a reduction in installation area and a shortening of manufacturing time, it is preferable to separate the pre-roll forming process and the post-roll forming process. However, since the same bumper reinforcing member can be obtained by either one of the two manufacturing methods described above, the manufacturing line may be constructed by suitably selecting one of the two.

EXAMPLES

So as to prove an advantage of the present invention, the bumper reinforcing member of the present invention manufactured by the similar roll forming was compared to the conventional bumper reinforcing member.

Figure 14:
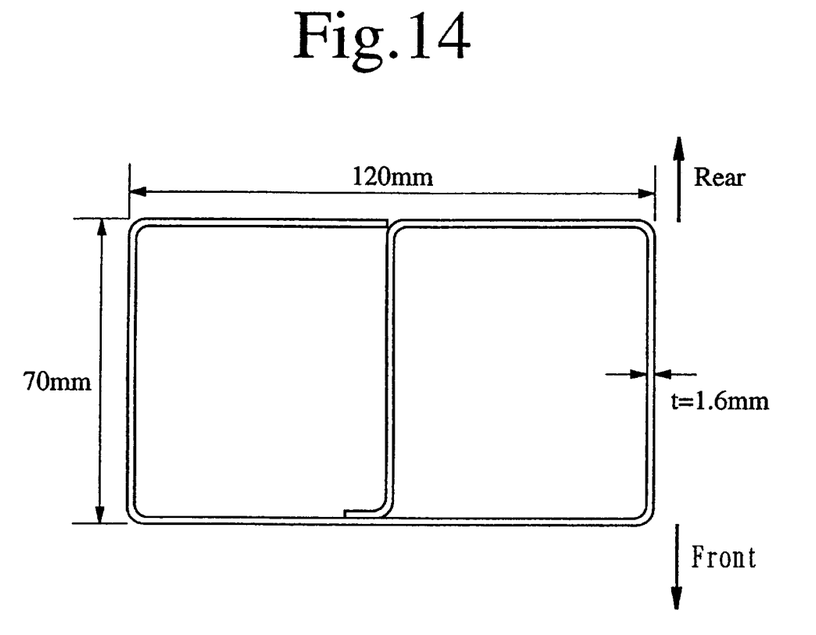
FIG. 14 is a side view showing a sectional structure of an embodiment based on the invention.
Figure 15:
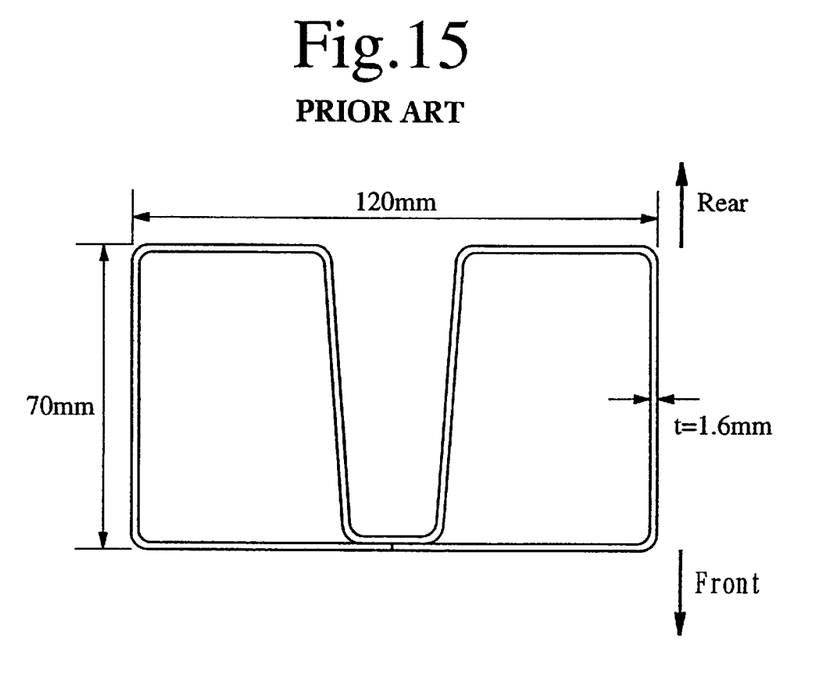
FIG. 15 is a side view showing a sectional structure of a conventional example formed as a comparison.

Each of the examples shown in FIG. 14 according to the present invention and the comparative example shown in FIG. 15 (which is a product disclosed in U.S. Pat. No. 5,395,036) is made of the same steel sheet of 1.6 mm in thickness and has the same external shape of 120 mm×70 mm in cross-section. For comparison, both of them are made into a simple linear tubular shape. Thus, they are different from actual products. The example according to the present invention is different only in its cross-sectional structure from the comparative example.

The two products were compared in regard to a necessary sheet width and an X-axis section secondary moment.

First, as to the necessary sheet width, it is 440.2 mm in the example of the present invention, whereas 485.4 mm is required in the comparative example. This means that the bumper reinforcing member of the present can save 10% in terms of the sheet width.

Even if the material saving is thus achieved, it is meaningless if an intrinsic performance of the rigid member such as a structural strength is reduced. Therefore, the geometrical moment of inertia in X-axis direction (which is in the direction of the thickness of the drawing sheet) were calculated for both. The result was that it was 565112.9 mm$^4$ in the example of the present invention and 554804.9 mm$^4$ in the comparative example. Thus, the example of the present invention is superior to the comparative example for as much as 2%.

From the above, it is clear that the bumper reinforcing member of the present invention has a higher structural strength while it accomplishes material saving.

As seen from the above, the bumper reinforcing member of the present invention is a closed cross-section type bumper reinforcing member that is formed by folding one original sheet, and it has an advantage that it can be simply manufactured by a continuous manufacturing line (roll forming). Moreover, the bumper front face and the bumper rear face are connected by the reinforcing rib, so that the structural strength of the product is high. This improvement in the structural strength is brought about not only by the reinforcing rib but also by the structure in which the inside of the bumper front face and the reinforcing rib are bonded by the contacting face portion that extends from the side edge to the folded-back edge portion.

The improvement in the structural strength due to the reinforcing rib can be seen concretely as an increase in the geometrical moment of inertia of the bumper reinforcing member. Further, since the contacting face portion that has a certain width is bonded to the inside of the bumper front face, a buckling of the bumper reinforcing member is prevented. Thus, the present invention provides a stronger bumper reinforcing member. Because of such improvement in the structural strength, a sheet that has a narrow width or a thinner thickness can be used as a bumper raw material. Thus, the bumper reinforcing member can be lightened, and the raw material cost can be reduced. Furthermore, with the reinforcing rib, it is not necessary to us e a separate member such as a bulkhead; accordingly, a reduction in the number of parts and a decrease in the number of assembling steps are made possible.

Furthermore, the reinforcing rib and the inside of the bumper front face are bonded together with the use of the contacting face portion, and such a bonding is accomplished by a welding method referred to as the roll spot welding, which is suitable for a continuous manufacturing line. This means that it is possible to select a combination of the roll forming processes and to select a welding means; and it is also possible to easily cope with a change in specification and to construct a manufacturing line whose layout is free as well.

As seen from the above, the bumper reinforcing member of the present invention has advantages that it can bring about the lightening of the bumper and improvement in the structural strength and also bring about reductions in equipment cost, manufacturing cost and labor or number of steps concerning the manufacture of bumpers.

We claim:

1. A bumper reinforcing member obtained from a tubular article of closed cross-section that is manufactured by roll-forming an original sheet into a tubular shape and then cut into a desired product length, wherein said tubular article is structured so that: a first side edge portion of said original sheet is folded at a folded-back edge portion and at a folded-in edge portion in this order; a contacting face portion that extends from a side edge of said first side edge portion to said folded-back edge portion is bonded to an inside of a bumper front face; an inside of the bumper front face and an inside of a bumper rear face are connected by a reinforcing rib that extends from said folded-back edge portion to said folded-in edge portion so as to form a half of a bumper cross-section; and a second side edge portion of said original sheet is bonded to a vicinity of said folded-in edge portion so as to form a remaining half of said bumper cross-section.

2. A bumper reinforcing member according to claim 1, wherein said tubular article is gradually curved and then cut into said desired product length.

3. A bumper reinforcing member obtained by cutting a tubular article into a desired product length, said tubular article being manufactured by roll-forming an original sheet, which has a first side edge and a second side edge, into an angular tubular shape, and said tubular article having a front face and a rear face,     wherein said tubular article is comprised of:

a folded-back edge portion and a folded-in edge portion which are obtained by folding said first side edge portion of said original sheet in a direction of a length of said original sheet,         a contacting face portion that extends from an end edge of said first side edge portion to said folded-back edge portion and is bonded to an inner surface of said front face of said tubular article, and         a reinforcing rib that extends from said folded-back edge portion to said folded-in edge portion and connects said inner surface of said front face and an inner surface of said rear face of said tubular article, and wherein said second side edge portion of said original sheet is connected to said folded-in edge portion, thus forming said tubular article that has a closed cross-section.

\* \* \* \* \*